Nov. 11, 1958
W. C. LANNING
2,860,125
PROCESS OF SEPARATING OLEFIN POLYMERS
Filed Dec. 28, 1953
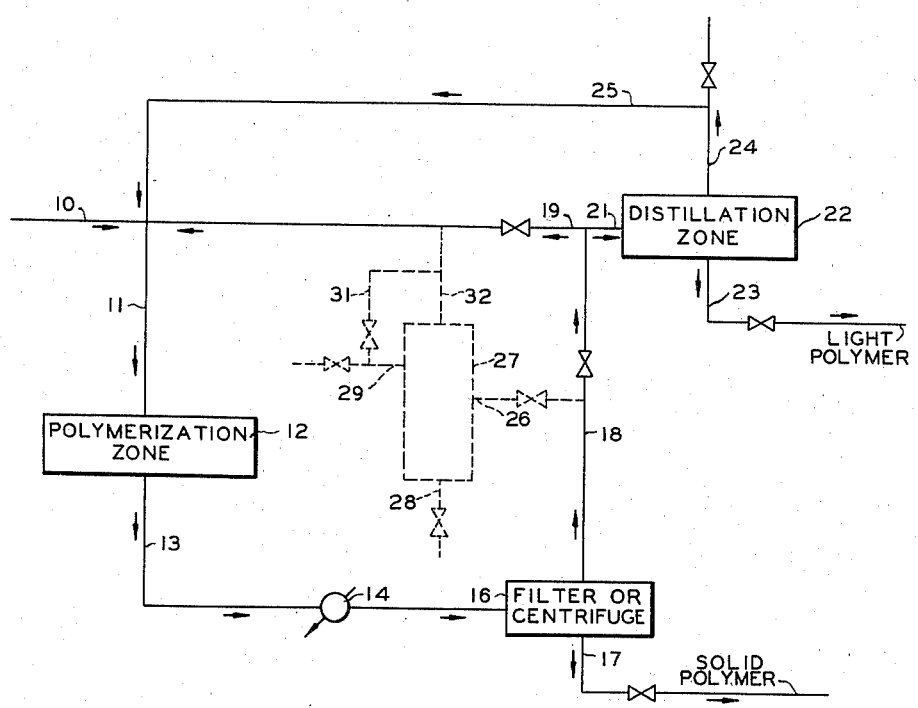
INVENTOR.
W.C. LANNING
BY Hudson & Young
ATTORNEYS United States Patent Office  2,860,125
Patented Nov. 11, 1958

2,860,125

PROCESS OF SEPARATING OLEFIN POLYMERS

William C. Lanning, Bartlesville, Okla., assignor to Phillips Petroleum Company, a corporation of Delaware Application December 28, 1953, Serial No. 400,520

12 Claims. (Cl. 260—93.7)

This invention relates to an improvement in the polymerization of 1-olefin to liquid and solid polymers over chromium oxide-containing catalyst. A specific aspect of the invention is concerned with the separation of a solid polymer from a mixture of liquid and solid polymers obtained by the polymerization of 1-olefins over chromium oxide-silica-and/or-alumina catalyst.

The polymerization of 1-olefins, particularly those having a maximum monomer chain length of 8 carbon atoms and no branching nearer the double bond than the 4-position, to produce a mixture of high molecular weight polymers of unique physical and chemical characteristics comprising solid, tacky, and liquid polymers is disclosed in the application of J. P. Hogan and R. L. Banks, Serial No. 333,576, filed January 27, 1953, now abandoned. In this type of process the effluent from the polymerization reactor contains the total polymer together with the hydrocarbon solvent which is a part of the feed to the process. Solvents which have been found suitable in the process include the paraffins and naphthenes, particularly those of 5 or more carbon atoms per molecule. Isooctane is a preferred solvent, but other solvents, such as pentane and methylcyclopentane, have been used with good results. Heretofore the polymer was recovered from the solvent by evaporation of the solvent and the solid polymer was then obtained by extraction of the tacky polymer with n-pentane or methylisobutylketone. The solid polymer is insoluble in n-pentane or methylisobutylketone at room temperature.

It has been found that one of the problems in polymerizing 1-olefins over chromium oxide-silica-and/or-alumina catalyst to solid and liquid polymers is the maintenance of the activity of the catalyst at a high level. During the continuous polymerization of these 1-olefins over such a catalyst the catalyst gradually becomes coated or masked with solid polymer, thereby lowering the activity of the catalyst and reducing the yield of valuable polymer. Any method of minimizing or reducing the polymer deposit on the catalyst would, of course, maintain its activity at a higher level and increase the yield of polymer.

The principal object of the invention is to provide an improved process for polymerizing 1-olefins over chromium oxide-containing catalyst. Another object of the invention is to provide a method of increasing catalyst life and efficiency with resulting increase in yield of polymer in a process for the polymerization of 1-olefins over chromium oxide-containing catalyst. A further object is to provide a simple and efficient method of separating solid polymer from the effluent from such a polymerization process. It is also an object of the invention to reduce the amount of distillation necessary in the separation of the liquid polymer from the solvent in a process in which 1-olefins in admixture with a solvent are polymerized over chromium oxide-containing catalyst so as to produce both solid and liquid polymers. Other objects of the invention will become apparent from a consideration of the accompanying disclosure.

In accordance with this invention, it has been found that heavy polymer from the polymerization of 1-olefins, particularly ethylene and/or propylene, over chromium oxide-silica-and/or-alumina catalyst can be simply and effectively removed by a continuous process from the solvent and lighter polymer fraction by cooling the total effluent so as to solidify or precipitate the heavy polymer, and filtering or otherwise separating the precipitated polymer from liquid. The polymerization temperature is usually well above 200° F., and oftentimes above 300° F., and it has been found that by cooling the effluent from the reaction to a temperature of about 150° F. the solid polymer is substantially all precipitated from the liquid polymer and diluent.

The cooling of the reactor effluent may be effective by conventional methods, such as by indirect heat exchange with a suitable coolant, but it is found that the cooling of the total effluent by direct heat exchange with cooled, condensed solvent which has been flashed from the solvent-liquid polymer fraction after separation of the solid polymer is a very desirable method of precipitating the solid polymer. In this method of operation the less soluble polymer is removed as a slurry and filtered to recover the solid polymer. Such a process takes advantage of the critical effect of temperature on the solubility of solid polymer such as polyethylene or polypropylene, since cooling to about 180° F., precipitates substantially all of the solid polymer from the diluent.

It has also been found that the solid polymer deposit on the catalyst in this type of process is materially reduced when some of the liquid polymer from such a process is recycled to the reactor along with the solvent. The concentration of the liquid polymer fraction in the diluent should be in the range of about 0.2 to 10 weight percent of the recycled solvent and the total feed to the reactor, including the solvent and liquid polymer, should include a concentration of 1-olefin in the range of about 1 to 20 percent.

After the solid polymer is removed from the reactor effluent a portion of the remaining fraction, including the solvent and the liquid polymer, is advantageously recycled to the reactor without separation of the polymer and solvent and the remaining portion of this fraction is separated by distillation, or other suitable method, into solvent and light polymer fractions. The solvent recovered in this manner is then incorporated in the recycled portion of the polymer-solvent fraction. In this manner all of the solvent is recycled and only that portion of the liquid polymer which is required to effect the desired concentration of the liquid polymer in the recycled solvent stream requires separation. This method of operation effects an appreciable saving in distillation costs.

Another method of accomplishing the desired recycle entails fractionating the solvent-liquid polymer fraction by flashing the solvent and separately recovering the solvent and liquid polymer, after which the desired amount of liquid polymer is returned to the solvent stream which is being recycled to the reactor.

The former method of effecting the recycle greatly reduces the amount of fractionation required and therefore is more economical than the latter method. In this method of operation only a small percent of the solvent-liquid polymer fraction need be separated into its components because of the direct recycle of a sufficient proportion of this fraction containing the required amount of liquid polymer to provide the desired concentration of the liquid polymer in the recycle solvent stream.

A more complete understanding of the invention may be had from a consideration of the accompanying drawing which is a diagrammatic flow of the process of the invention. A suitable 1-olefin feed, such as ethylene or propylene or a mixture of these olefins, is passed through line 10 into line 11 where it is mixed with streams from lines 19 and 25 hereinafter described. The stream in line 11 is made up of 1-olefin, a suitable solvent, and liquid polymer from the polymerization process. This stream constitutes the feed to the process and is introduced to polymerization reactor 12 which contains a catalyst consisting essentially of chromium oxide deposited on at least one member of the group consisting of silica and alumina. Conditions in the reactor are maintained in accordance with the disclosure in the aforesaid application of Hogan and Banks, namely, in a temperature range of 150 to 450° F. and a pressure sufficient to maintain the diluent in the liquid phase, usually at least 100 to 300 p. s. i. g. and preferably about 500 p. s. i. g. The effluent from the reactor is passed via line 13 through a cooler 14 which reduces the temperature of the reaction effluent sufficiently to precipitate the solid polymer. The resulting slurry of solid polymer in solvent and liquid polymer is passed to a separating means 16 which may comprise a filter or centrifuge. The solid polymer is withdrawn through line 17 and the remaining fraction, comprising solvent and liquid polymer is passed through line 18 to lines 19 and 21. The stream flowing through line 18 is divided so that the proper amount of direct recycle to provide the required liquid-polymer concentration is passed through line 19 and the balance of the stream flowing through line 18 is passed through line 21 to separation zone 22, which may be a distillation zone from which the solvent is flashed overhead and the liquid polymer is recovered as a bottoms product and removed through line 23 as a product of the process. The solvent passing through line 24 is then returned, in whole or in part, by means of line 25 to the feedstream in line 11 along with the solvent-liquid polymer fraction recycled directly through line 19.

In another embodiment of the invention the solvent-liquid polymer fraction is passed from line 18 through line 26 to a separation zone 27 for separation of the fraction into any tacky, semisolid polymer in the stream which is recovered through line 28, liquid polymer which is taken off through line 29, and solvent which is taken off through line 32. A selected portion of the liquid polymer passing through line 29 is transferred via line 31 to line 32 where it is introduced to the solvent stream which is being recycled through lines 32 and 19 to the feedstream in line 11. The remainder of the liquid polymer is recovered from line 29 as product.

The following illustrative examples are provided in order to show certain specific methods of operation and to emphasize the advantages of the invention. These examples should not be interpreted as imposing unnecessary limitations on the invention.

EXAMPLE I

An ethylene-polymerization run was made over a chromium oxide-silica-alumina catalyst utilizing isooctane as a solvent and a temperature in the range of 320 to 330° F.; sufficient pressure was maintained in the system to insure liquid-phase operation. The isooctane-soluble polymer from an ethylene-propylene copolymerization run was added to the feed in the amount of 18 weight percent of the ethylene feed or 0.4 weight percent of the isooctane solvent. After 5 hours the catalyst deposits amounts to 12.1 percent of the ethylene converted.

A second ethylene-polymerization run was made under the same conditions without the addition of soluble polymer to the feed. After 5 hours the catalyst deposits amounted to 14.7 weight percent of the ethylene converted.

A third ethylene-polymerization run was made under the same conditions without the addition of soluble polymer to the feed and the polymer deposit on the catalyst over a 5-hour period was found to be 15.7 weight percent of the converted ethylene.

The average value of the catalyst deposits in the runs without simulated recycle of polymer was 15.2 weight percent of the converted olefin, while with simulated recycle, the deposit on the catalyst amounted to 12.1 weight percent, or a reduction of three percentage points. This effect is rather remarkable considering the low concentration of recycled polymer (only 0.4 weight percent of the recycled solvent). In an actual process utilizing soluble-polymer recycle, polymer can build up to any desired level and might well be used at a concentration of 5 to 10 weight percent of the total solvent.

Example I illustrates the advantage of reduced polymer formation on the catalyst by the better solvent action of the recycled polymer. This reduction in polymer deposit permits higher yields and longer runs with the catalyst before regeneration is required.

EXAMPLE II

In a process effected in accordance with the preferred modification of the invention the ethylene in the feedstream is maintained at a concentration of 2 weight percent in the total recycle. Light polymer is allowed to build up to 10 weight percent of the recycle solvent. The product consists of 10 weight percent soluble and 90 weight percent insoluble polymer at precipitation conditions. The following table shows the compositions of the various streams (referring to the lines in the drawing) in parts by weight at steady state conditions.

Table

| Stream | 10 | 11 | 13 | 18 | 17 | 21 | 19 | 25 | 23 |
|---|---|---|---|---|---|---|---|---|---|
| Ethylene | 2.0 | 2.0 | 0 | 0 | 0 | 0 | 0 | 0 | 0 |
| Light Polymer | 0 | 9.8 | 10.0 | 10.0 | 0 | 0.2 | 9.8 | 0 | 0.2 |
| Solid polymer | 0 | 0 | 1.8 | 0 | 1.8 | 0 | 0 | 0 | 0 |
| Solvent (C$_8$) | 0 | 88.2 | 88.2 | 88.2 | 0 | 1.8 | 86.4 | 1.8 | 0 |
| Total | | 100.0 | | | | 2.0 | 96.2 | 1.8 | |

On the basis of the above figures, the feed of the distillation zone is only $100[2/(96.2+1.8)] = 2$ weight percent of the solvent stream.

EXAMPLE III

Under operating conditions similar to those of Example II, but allowing the light polymer to build up to only 5 weight percent of the solvent stream, the feed to distillation zone 22 is only 4 weight percent of the solvent stream.

EXAMPLE IV

Increasing the ethylene feed to 6 weight percent and allowing the light polymer to build up to 5 weight percent of the solvent requires a feed to distillation zone 22 which is only 11.3 weight percent of the recycle stream.

Examples II, III, and IV serve to illustrate the economy in solvent distillation effected by direct recycle of solvent-liquid polymer from the step of separating the solid polymer to the polymerization reactor.

Various modifications of the invention will become apparent to those skilled in the art and the illustrative details disclosed are not to be construed as imposing unnecessary limitations on the invention.

I claim:

1. A process for polymerizing a feed comprising at least one 1-olefin having a maximum monomer chain length of 8 carbon atoms and no branching nearer the double bond than the 4-position which comprises contacting said feed with a catalyst comprising chromium oxide and at least one member of the group consisting of silica and alumina under polymerizing conditions so as to form liquid and tacky semi-solid to solid polymer, whereby the catalyst becomes at least partially coated with said polymer; separating solid polymer from the effluent from said contacting as a product of the process so as to leave a fraction comprising liquid polymer; and recycling at least a portion of said liquid polymer to said contacting so as to minimize the coating of polymer on said catalyst.

2. The process of claim 1 in which said feed is mixed with a hydrocarbon solvent and the resulting mixture is maintained in liquid phase in the contacting zone.

3. The process of claim 2 including cooling said effluent in liquid phase so as to precipitate solid polymer; separating the precipitated solid polymer from the solvent and the liquid polymer therein; and recycling at least a portion of the solvent and liquid polymer to the contacting step.

4. The process of claim 2 including cooling said effluent in liquid phase so as to precipitate solid polymer; separating the precipitated solid polymer from the solvent and the liquid polymer therein; recycling a portion of the solvent and the liquid polymer to the contacting step; separating the solvent and the liquid polymer from a remaining portion; and recycling the solvent to the contacting step.

5. The process of claim 2 including separating said effluent into a solid polymer fraction and a liquid fraction comprising principally solvent and liquid polymer; fractionating said liquid fraction into a solvent fraction and a liquid polymer fraction; and returning only a portion of said liquid polymer together with said solvent fraction to the contacting step along with said feed.

6. In a continuous liquid-phase process for polymerizing 1-olefins having a maximum chain length of 8 carbon atoms and no branching nearer the double bond than the 4-position in admixture with a hydrocarbon solvent in contact with a chromium oxide-containing catalyst in which normally liquid and solid polymers are formed and said catalyst gradually becomes coated with solid polymer so formed, the improvement comprising cooling the effluent from the polymerization step so as to precipitate solid polymer; separating the resulting precipitated solid polymer from the liquid polymer-solvent fraction; adjusting the polymer concentration in said fraction to the range of 0.2 to 10 weight percent thereof; admixing with said fraction at least one 1-olefin having a maximum chain length of 8 carbon atoms and no branching nearer the double bond than the 4-position so as to provide a feed containing from 1 to 20 weight percent of said 1-olefin; and passing said feed to the polymerization step.

7. The process of claim 6 in which said effluent is cooled to a maximum temperature of about 150° F.

8. The process of claim 6 in which the cooling step is effected by flashing solvent from said liquid polymer-solvent fraction, condensing and cooling the flashed solvent, and admixing the cooled solvent with said effluent.

9. A process for polymerizing 1-olefins having a maximum chain length of 8 carbon atoms and no branching nearer the double bond than the 4-position including the steps of passing a feed comprising at least one 1-olefin admixed with a hydrocarbon solvent inert under the polymerizing conditions of the process, the concentration of olefin being in the range of 1 to 20 weight percent of the feed, through a contacting zone in liquid phase in contact with a catalyst consisting essentially of a minor proportion of chromium oxide associated with a major proportion of a silica-alumina composite under polymerizing conditions so as to form normally liquid and solid polymer whereby said catalyst gradually becomes coated with solid polymer; cooling the resulting effluent from said contacting step to about 180° F. to precipitate substantially all of the normally solid polymer therein; recovering the resulting precipitate from said effluent as a product of the process so as to leave a fraction comprising liquid polymer and solvent; adjusting the concentration of liquid polymer in said fraction to the range of 0.2 to 10 weight percent of same; and recycling the adjusted fraction to the contacting step as a portion of said feed.

10. A process which comprises forming a solution of a 1-olefin having a maximum chain length of 8 carbon atoms and no branching nearer the double bond than the 4-position in admixture with a hydrocarbon solvent selected from the group consisting of paraffins and naphthenes which are liquid and inert under the polymerization conditions subsequently described, contacting said solution with a polymerization catalyst comprising, as an essential ingredient, chromium oxide, said catalyst being capable of converting said olefin to normally solid polymer, under polymerization conditions including a temperature in the range 150 to 450° F. and a pressure sufficient to maintain said solvent substantially in the liquid phase, withdrawing a mixture comprising a solution of said polymer in said solvent, causing solid polymer to precipitate from said solution, removing precipitated solid polymer as a product of the process, recovering a resulting solution containing liquid polymer, adding to said solution a 1-olefin of the type previously described herein, and contacting a resulting mixture, under polymerization temperature and pressure conditions as above described, with a polymerization catalyst comprising chromium oxide as an essential ingredient, and recovering a resulting polymer.

11. A process according to claim 1 wherein said 1-olefin is ethylene.

12. A process according to claim 1 wherein said 1-olefin is propylene.

References Cited in the file of this patent
UNITED STATES PATENTS
2,692,257    Zletz  ------------------ Oct. 19, 1954